United States Patent
Nelsen

(10) Patent No.: US 8,899,927 B2
(45) Date of Patent: Dec. 2, 2014

(54) AUTOMATICALLY ADJUSTING WIND ENERGY PADDLEWHEEL

(76) Inventor: John Andrew Nelsen, Bozeman, MT (US)

(*) Notice: Subject to any disclaimer, the term of this patent is extended or adjusted under 35 U.S.C. 154(b) by 683 days.

(21) Appl. No.: 13/317,305

(22) Filed: Oct. 15, 2011

(65) Prior Publication Data
US 2013/0094964 A1    Apr. 18, 2013

(51) Int. Cl.
*F01D 5/00* (2006.01)
*F03D 3/00* (2006.01)
*F03D 3/06* (2006.01)

(52) U.S. Cl.
CPC ............. *F03D 3/002* (2013.01); *F03D 3/067* (2013.01); *F05B 2240/312* (2013.01); *Y02E 10/74* (2013.01)
USPC .................. 416/132 B; 416/117; 416/140

(58) Field of Classification Search
CPC ... F03D 3/064; F03D 3/067; F05B 2210/404; F05B 2240/2023; F05B 2240/2212; F05B 2240/311; F05B 2240/312; F05B 2240/313
USPC .......... 416/111, 117, 132 A, 132 B, 119, 140; 290/44, 55
See application file for complete search history.

(56) References Cited

U.S. PATENT DOCUMENTS

| | | | | |
|---|---|---|---|---|
| 648,792 | A | * | 5/1900 | Redfern .......................... 472/13 |
| 1,618,549 | A | * | 2/1927 | O'Toole ........................ 416/111 |
| 4,191,507 | A | * | 3/1980 | DeBerg ......................... 416/117 |
| 4,218,183 | A | * | 8/1980 | Dall-Winther .................. 416/41 |
| 4,678,394 | A | * | 7/1987 | Willoughby ................... 415/141 |
| 5,784,978 | A | * | 7/1998 | Saiz .......................... 114/102.17 |
| 7,183,664 | B2 | * | 2/2007 | McClintic ........................ 290/55 |
| 2012/0242084 | A1 | * | 9/2012 | Agtuca .......................... 290/44 |

* cited by examiner

*Primary Examiner* — Edward Look
*Assistant Examiner* — Adam W Brown

(57) ABSTRACT

A device is described herein that harnesses wind energy by employing large rectangular airfoils mounted on a rotating frame. As the frame rotates, sliders cause the airfoils to expand and contract in a cyclical pattern. The aerodynamic drag of the airfoils is maximized during the power stroke and minimized during the recoil stroke. When subjected to wind, the wind causes more pressure on the expanded airfoils than the contracted ones, which drives rotation of the entire frame. The design is highly scalable, limited only by stiffness and strength limitations of the materials used in its construction. It may be possible to achieve efficiency of power generation that greatly surpasses that of traditional propeller style windmills.

10 Claims, 1 Drawing Sheet

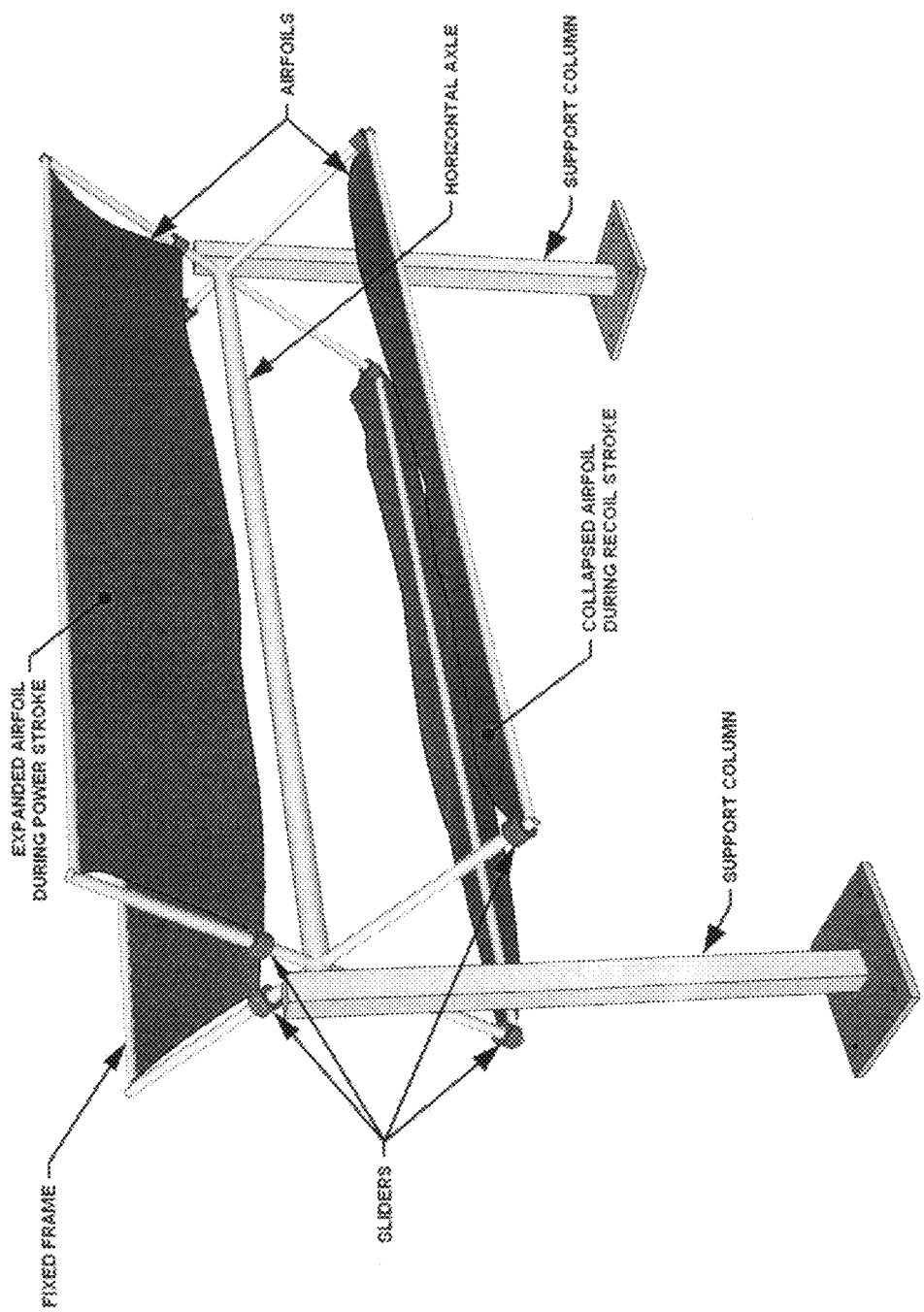

AUTOMATICALLY ADJUSTING WIND ENERGY PADDLEWHEEL

BACKGROUND OF THE INVENTION

Absorbing power from the wind represents just one of many different forms of alternative energy. Interest in alternative energy resources has experienced steady increases over the past several decades. This trend stems from the combination of environmental awareness, advances in material science, and the continued increase in the demand for electricity.

Widespread residential electrical service began reaching maturity in the late 1920's as a large portion of the city-dwelling general public consuming electricity on a daily basis. The need for electric supply was large and grew steadily with the advent of population growth and new electrical appliances. In the early years of high electricity use, the demand was met mostly by fossil fuel burning steam power plants and augmented by a few hydroelectric dam sites. Since this time the majority of all electrical power generation has come from the consumption of non-renewable resources; chiefly oil, natural gas, coal, and uranium.

Wind mill use goes back almost a thousand years, seeing the most extensive use in Europe, though there is evidence that the first windmills may have been invented in Persia.[1] The early windmills were constructed chiefly of wood and fabric. These early wind energy devices used massive gear systems to transmit the mechanical power from the propeller shaft to agricultural grinding wheels or other useful devices. The wallower gear, stone nut, and great spur wheels of old have since been replaced by high efficiency gear boxes with precisely machined components made from high strength steels. These improvements alone make wind power cultivation much more practical. Yet, when a $17^{th}$ century windmill is compared against its modern counterpart the numerous, fundamental similarities prevail.

The most basic difference between the early windmills and modern ones is the nature of the propeller blades. Windmills of old had broad propeller blades whereas modern propeller blades are narrow and long. The old style wide blades were successful in converting linear wind energy to rotational shaft power but were of course much less efficient in doing so than modern windmill blades. The operation of the original wind mills was valuable because it accomplished a task for which the alternative solution was more costly. The alternatives may have been grinding grain manually or using bound livestock to supply the shaft power of the grinding wheel. This principle of cost effectiveness is the ultimate goal of wind power devices in today's world.

The chief competitor to modern windmill energy is electricity that is cheaply produced in mass quantities by a large number of different mechanisms including hydroelectric dams and burning fossil fuels in steam power plants, which were responsible for 3% and 86% of all energy consumed in 2004 respectively.[4] Meanwhile windmill electricity generation accounted for just 0.12% of all electricity production. Windmills rely on highly engineered propeller blades to maximize the torque produced at the propeller shaft. A windmill from centuries past would simply not produce enough power to justify its installation costs.

The wind power industry is dominated by propeller-type windmills. The high cost of modern wind turbines stems in part from the extremely high-tech nature of the propeller blades. Specifically, the lightweight composite materials that are commonly chosen for the construction of the propeller blades are very expensive to obtain and add difficulty while manufacturing the precise geometry of the blades.

Propellers dominate wind energy production mainly because of the huge body of knowledge that has been built up over the past century on propeller design and manufacturing. In other words, the high advancement of propeller technology has caused wind turbine creators to forego other possibilities and choose the known-good science on which to base their products. There is no doubt that these modern windmills are effective in the role of generating electrical power and that they perform a great service for society in replacing more polluting methods of energy production. However, this explanation does not eliminate the need to question whether the industry has gone in the right direction. Might there be a whole different strategy of wind energy absorption that will outperform the propeller driven devices?

Modern, narrow-blade propellers have long been used in high-velocity applications such as aircraft propulsion, but only recently have such propellers seen high-tech design for insertion into low velocity applications. Even an ideally designed propeller can make use of only a small portion of the air that passes through its spatial envelope. One very popular 1.5 Megawatt modern windmill propeller sweeps through a frontal area of 4,070 meter$^2$, though the useful aerodynamic interface comprises less than 8% of that area. Considering all the drawbacks mentioned hereto, it bears explaining why the industry seems devoted to using propeller airfoils exclusively to absorb energy from the wind.

The principle alternative to propellers for the absorption of wind energy is the use of sails and the like. These broad surfaces need not be arranged like centuries old wind mills. The immediate advantage of this change is that they can be produced much more cheaply and easily than the single piece propeller blades, which require precise, expensive manufacturing. Since the initial setup cost is the premiere expense for the life of the product, any significant reduction in this cost will correspondingly increase the economy of energy production overall.[5] However, the cost per unit of energy will also fluctuate with the design and efficiency of the device as a whole.

The avian anatomy uses large, sweeping airfoils very effectively at low velocity, but to mimic a bird's flapping motion would not be entirely useful for producing energy because it would be difficult to transform the flap cycle into rotational shaft work. However, it may be possible to follow the principles of a bird's flapping motion to usefully and efficiently employ large, thin airfoils to collect the energy of the wind.

REFERENCES

1. "History of Windmills", www.windmillworld.com, Sep. 19, 2006
2. Munson, Bruce R., et. al.; Fundamentals of Fluid Mechanics, Fourth Edition; John Wiley & Sons, Inc. 2002
3. "History of the Electric Power Industry", www.eei.org/industry_issues, Feb. 5, 2007
4. "Renewable Energy Trends 2004", www.eia.doe.gov/cneaf, Feb. 8, 2007
5. National Renewable Energy Laboratory. (2006). *Wind Turbine Design Cost and Scaling Model* (Technical Report NREL/TP-500-40566)
6. US Department of Energy. (2008). 20% *Wind Energy by 2030* (DOE/GO-102008-2567)

BRIEF SUMMARY OF THE INVENTION

This invention is a device which uses wind energy to generate shaft power for the purposes of generating electricity.

Large sail-like surfaces are mounted around a central axle that extends horizontally from one tower support to another. The sail-like surfaces collapse during half of the revolution cycle to allow a differential in wind resistance; this differential drives the rotational motion. The surface area used to absorb wind energy is much larger than that of propeller style wind mills, and the components of this device can be manufactured more economically than the propeller style wind mills.

DESCRIPTION OF DRAWINGS

FIG. 1: An overall view of the installed device is shown. Two support towers are shown coming up from ground level. Airfoils are visible in expanded and collapsed states.

DETAILED DESCRIPTION OF THE INVENTION

There is an axle that is supported directly from ground level by sturdy, rigid supports. The axis of this axle is the main axis of rotation of the device as a whole. The alignment of this axle is horizontal. The useful workload that is harvested from the device is connected to this axle at either end or at both ends. The driving force that causes the axle to rotate is the influence of the ambient wind condition on the airfoils. These airfoils are physically hosted by airfoil frames, which support the outer edges of the airfoils. The airfoil frames are attached to the axle such that they extend radially from the axle. The airfoil frames are spaced regularly around the axle so that if a four airfoil configuration is manufactured, then the end view of the axle with attached airfoils looks like a plus sign.

The term inboard hereafter means relatively close to the axle, and the term outboard means relatively further away from the axle. The airfoils, being built into their host airfoil frames, have the ability to expand and contract. This ability is achieved either by flattening out of a sail type airfoil or by telescoping of a rigid airfoil. The simplest version of the airfoil is a rectangular, sail-type airfoil whose four corners are attached as follows: the two outboard corners of the sail are attached rigidly to the frame, and the two inboard corners are attached to sliders that are free to slide in the inboard-outboard direction along the main supports of the frame. Thus, when a given airfoil frame is in the vertical, upward position the weight of the sliders has caused them to fall inboard, expanding the sail, and when that airfoil is in the vertical downward position, one half cycle later, the weight of the sliders has caused them to fall outboard, collapsing the sail on itself. In this configuration example, the power stroke is centered about the 12 o'clock position of the airfoils.

The design of the axle is not critical to the effectiveness of the device, and its weight is not critical because it is directly supported from the ground by a strong framework. In fact, if the axle is extra heavy, then the added rotational mass will add stability to the system while in motion.

The total number of airfoils that is ideal for the present invention varies in response to numerous inputs. In general, the more numerous the active airfoils, the smoother the cyclic motion will be, but too many airfoils would leave the airspace so crowded as to cause detrimental interference between adjacent wind-catching surfaces, particularly during the heart of the power stroke. Conversely, if too few airfoils are present, then there would be a large gap between the maximum power input of one airfoil to that of the next. To achieve continuity of power input there must be some overlap between the power stroke of one airfoil to the next.

The main disadvantage of this wind power generator versus traditional windmill is its very limited ability to rotate around a vertical axis to align itself with the wind direction. This is mainly due to the fact that a traditional windmill is set up on a single pole, which represents a single point of contact with the ground and a single permanent setting. The invention described in this document has two permanent settings at ground level: one at each host wheel. Whereas a machine supported on a single pole can align itself to any cardinal direction by rotation of that pole, rotation of the present invention requires physical displacement of at least one of the two ground settings. This device is ideally suited for geographic locations that have a consistent, "prevailing" wind direction.

Though they would be relatively difficult, there are methods to rotate this device to face the wind's direction. The most all-encompassing (and most costly) option is to allow the entire mechanism to rotate 180° on demand. This method is effective because the wind-catching action can be reversed; that is, when the length of the system is aligned running from north to south it is able to take advantage of either an easterly wind or a westerly wind. Of the nearly endless different methods of performing this action, one of the most practical seems to be anchoring one of two axle-supports into a permanent location, allowing it to rotate, and set the other axle support on a semi-circular track. The movable axle support would follow the track when rotation of the system was needed and would then lock down in the specified location along the track. In this setup, it would be useful for the permanently located axle support that acted as the hub of the rotation to be solely responsible for driving the workload as opposed to forcing a mechanical linkage from the other end of the axle to the workload.

The invention claimed is:

1. A wind energy paddlewheel comprising a horizontal axis that structurally supports fixed frames; the fixed frames extending radially from the horizontal axle; on each fixed frame is mounted a rectangular sail-type airfoil, which is connected at its four corners as follows: two corners are attached to the frame itself and are therefore disallowed from moving with respect to the frame, and the other two corners are attached to sliders that translate along the radial members of the frame; the sliders are free to translate in the radial direction with regard to the horizontal axis as caused by gravity or a mechanically driven action, and, in doing so, result in the expanding or contracting motion of the airfoil such that the highest wind resistance occurs at one position and low wind resistance occurs at the opposite position of the cycle.

2. The wind energy paddlewheel of claim 1, wherein the horizontal axle is mounted on support columns which also support the conveyance of rotational energy to an output device.

3. The wind energy paddlewheel of claim 1, wherein the fixed frames are arranged such that they are evenly spaced around their axle.

4. The wind energy paddlewheel of claim 1 wherein cyclical motion of the paddlewheel results in a power stroke and a recoil stroke for each airfoil and the power stroke occurs while the airfoil is fully expanded and the recoil stroke occurs while the airfoil is fully contracted.

5. The wind energy paddlewheel of claim 4, wherein the cyclical motion exhibits the following behavior: the transition from the power stroke to the recoil stroke occurs as the motion of the sliders towards the fixed corners of the airfoil causes the airfoil to contract, and the transition from recoil stroke to power stroke occurs as the motion of the sliders away from the fixed corners of the airfoil causes the airfoil to expand.

6. The wind energy paddlewheel of claim 4, wherein the cyclical motion results in exactly one power stroke and one recoil stroke for each airfoil during each full revolution of the paddlewheel.

7. The wind energy paddlewheel of claim 1, wherein the paddlewheel may be retrofitted or originally manufactured with alternative airfoil shapes.

8. The wind energy paddlewheel of claim 1, wherein the airfoils are constructed of fabric stretched over the frame or of rigid components which telescope one with another to cause expansion and contraction of the airfoil as a whole.

9. The wind energy paddlewheel of claim 1, wherein the axle is connected via a mechanical linkage to an electricity generator.

10. The wind energy paddlewheel of claim 9, wherein the mechanical linkage includes a gear reduction that can be altered to accommodate various input speeds from the rotating paddlewheel.

\* \* \* \* \*